US009064409B1

(12) United States Patent
Sivertsen

(10) Patent No.: US 9,064,409 B1
(45) Date of Patent: Jun. 23, 2015

(54) TRAFFIC SIGNAL CONNECTED DIGITAL ELECTRONIC DISPLAY AND METHOD OF CONTROLLING THE SAME

(71) Applicant: American Megatrends, Inc., Norcross, GA (US)

(72) Inventor: Clas G. Sivertsen, Lilburn, GA (US)

(73) Assignee: American Megatrends Inc., Norcross, GA (US)

( * ) Notice: Subject to any disclaimer, the term of this patent is extended or adjusted under 35 U.S.C. 154(b) by 0 days.

(21) Appl. No.: 14/133,392

(22) Filed: Dec. 18, 2013

Related U.S. Application Data

(63) Continuation of application No. 13/188,910, filed on Jul. 22, 2011, now Pat. No. 8,675,909.

(51) Int. Cl.
*G06K 9/00* (2006.01)
*G08G 1/07* (2006.01)

(52) U.S. Cl.
CPC .................................... *G08G 1/07* (2013.01)

(58) Field of Classification Search
None
See application file for complete search history.

(56) References Cited

U.S. PATENT DOCUMENTS 5,150,116 A 9/1992 West
6,813,554 B1 * 11/2004 Ebert ........................ 701/117
6,909,963 B1 * 6/2005 Ebert ........................ 701/117
7,167,106 B2 * 1/2007 Haase ........................ 340/909
7,495,631 B2 * 2/2009 Bhakta et al. ............... 345/1.1
7,538,689 B2 * 5/2009 Haase ........................ 340/909
7,800,514 B2 * 9/2010 Lyle et al. .................. 340/905
8,232,896 B2 * 7/2012 Keller ........................ 340/944
8,326,687 B2 * 12/2012 Tanaka ...................... 705/14.49
2003/0067399 A1 * 4/2003 Wesley ..................... 340/907
2006/0176192 A1 8/2006 Noriega
2006/0229939 A1 10/2006 Bhakta et al.
2007/0081339 A1 * 4/2007 Chung et al. ............... 362/294
2007/0257817 A1 * 11/2007 Mahoney .................. 340/929
2008/0010134 A1 1/2008 Musumeci
2009/0299857 A1 12/2009 Brubaker
2010/0063880 A1 3/2010 Atsmon et al.
2010/0299189 A1 * 11/2010 Tanaka ...................... 705/14.4
2013/0022245 A1 1/2013 Sivertsen

OTHER PUBLICATIONS

International Search Report dated Oct. 12, 2012 in PCT/US12/047700.
U.S. Official Action dated Mar. 11, 2013 in U.S. Appl. No. 13/188,910, filed Jul. 22, 2011, First Named Inventor: Sivertsen.
U.S. Official Action dated May 30, 2013 in U.S. Appl. No. 13/188,910, filed Jul. 22, 2011, First Named Inventor: Sivertsen.
U.S. Notice of Allowance/Allowability dated Sep. 19, 2013 in U.S. Appl. No. 13/188,910, filed Jul. 22, 2011, First Named Inventor: Sivertsen.

* cited by examiner

*Primary Examiner* — Tsung-Yin Tsai
(74) *Attorney, Agent, or Firm* — Lee & Hayes, PLLC

(57) ABSTRACT

A digital electronic display connected to a traffic signal and a method of controlling the digital electronic display are provided. The digital electronic display includes a communication unit configured to receive content including content segments and metadata, a display screen, and a processor. The processor is configured to monitor the traffic signal to determine when, and the duration during which, a red light and a green light of the traffic signal is illuminated, present a content segment on the display screen corresponding to the red light based on the metadata and substantially for the entire duration when the red light is illuminated, and control the display screen to operate in a low-power state substantially for the entire duration when the green light is illuminated.

19 Claims, 8 Drawing Sheets

TRAFFIC SIGNAL CONNECTED DIGITAL ELECTRONIC DISPLAY AND METHOD OF CONTROLLING THE SAME

CROSS-REFERENCE TO RELATED APPLICATIONS

This application is a continuation of co-pending U.S. application Ser. No. 13/188,910, entitled "TRAFFIC SIGNAL CONNECTED DIGITAL ELECTRONIC DISPLAY AND METHOD OF CONTROLLING THE SAME" filed Jul. 22, 2011, which is expressly incorporated herein by reference in its entirety.

TECHNICAL FIELD

The present disclosure is related to a digital electronic display presenting information, such as advertising content. More particularly, the present invention is related to a digital electronic display that is connected to a traffic signal, in which advertising and potentially other types of content are presented on the digital electronic display. The present disclosure is also related to a method of controlling such a digital electronic display.

BACKGROUND

In most cities and towns throughout the world, advertisements are strategically placed alongside city and highway roads to be readily viewed by motorists and pedestrians. Such advertisements are typically presented using billboards. However, other types of billboards are also used (for example, mobile billboards and even human billboards), as are other types of advertising media including wall paintings. Increasingly, digital signs are replacing traditional signs due to the ease of updating the content displayed thereon, the ability to present more sophisticated advertisements (for example, advertisements including animated graphics and even three-dimensional content), the ever-increasing cost, time delay, and inconvenience of distributing printed material, etc.

It has been proposed to use displays in conjunction with traffic signals for advertising purposes. However, conventional approaches have many drawbacks that have prevented any type of widespread use of such an advertising method. For example, existing circuit configurations used to realize cooperation between a display and a traffic signal are complicated and expensive. Moreover, a time-consuming and difficult set-up process is often required. Additionally, the content stored in conventional displays used in conjunction with traffic signals is difficult to update.

From the point of view of advertisers, such lack of widespread use is unfortunate because the advertising real estate associated with traffic signals represents significant potential to reach large and captive audiences. From the point of view of government agencies, a potentially significant source of revenue remains untapped. Many commuters would also appreciate the respite from the boredom and frustration associated with waiting at a red light that would be provided by displaying content at traffic signals.

It is with respect to these considerations and others that the present invention has been made.

SUMMARY

It should be appreciated that this Summary is provided to introduce a selection of concepts in a simplified form that are further described below in the Detailed Description. This Summary is not intended to be used to limit the scope of the claimed subject matter.

In one embodiment, a digital electronic display operates in conjunction with a traffic signal and includes a communication unit configured to receive content including content segments and metadata, a display screen, and a processor. The processor is configured to monitor the traffic signal to determine when and the duration during which each of at least a red light and a green light of the traffic signal is illuminated. The processor is further configured to present a content segment on the display screen corresponding to illumination of the red light based on the metadata and substantially for the entire duration when the red light is illuminated, and to control the display screen to operate in a low-power state substantially for the entire duration when the green light is illuminated.

In another exemplary embodiment, a method of controlling a digital electronic display connected to a traffic signal is provided. The method includes receiving content including content segments and metadata, monitoring the traffic signal to determine when and the duration during which each of at least a red light and a green light of the traffic signal is illuminated, presenting a first content segment on a display screen corresponding to the red light based on the metadata and substantially for the entire duration when the red light is illuminated, and controlling the display screen to operate in a low-power state substantially for the entire duration when the green light is illuminated.

In another exemplary embodiment, a computer-readable storage medium has computer-readable instructions stored thereupon that, when executed by a computer, cause the computer to receive content including content segments and metadata, monitor a traffic signal to determine when and the duration during which each of at least a red light and a green light of the traffic signal is illuminated, present a content segment on a display screen corresponding to the red light based on the metadata and substantially for the entire duration when the red light is illuminated, and control the display screen to operate in a low-power state substantially for the entire duration when the green light is illuminated.

In still an additional embodiment, a traffic signal is provided that includes a supporting structure, a traffic signal controller mounted on the supporting structure and which outputs control signals, and a digital electronic display mounted on the supporting structure, connected to the traffic signal controller. The digital electronic display comprises a communication unit configured to receive content including content segments and metadata, a display screen, and a processor. The processor is configured to control the display of at least a red light and a green light on the display screen through illumination of one or more portions of the display screen with reference to the control signals received from the traffic signal controller, and present a content segment on the display screen corresponding to the red light based on the metadata and substantially for the entire duration when the red light is illuminated.

These and various other embodiments and advantages of the present invention may become apparent from the following detailed description, taken in conjunction with the accompanying drawings, illustrating by way of example the principles of the invention.

DETAILED DESCRIPTION

Figure 1:
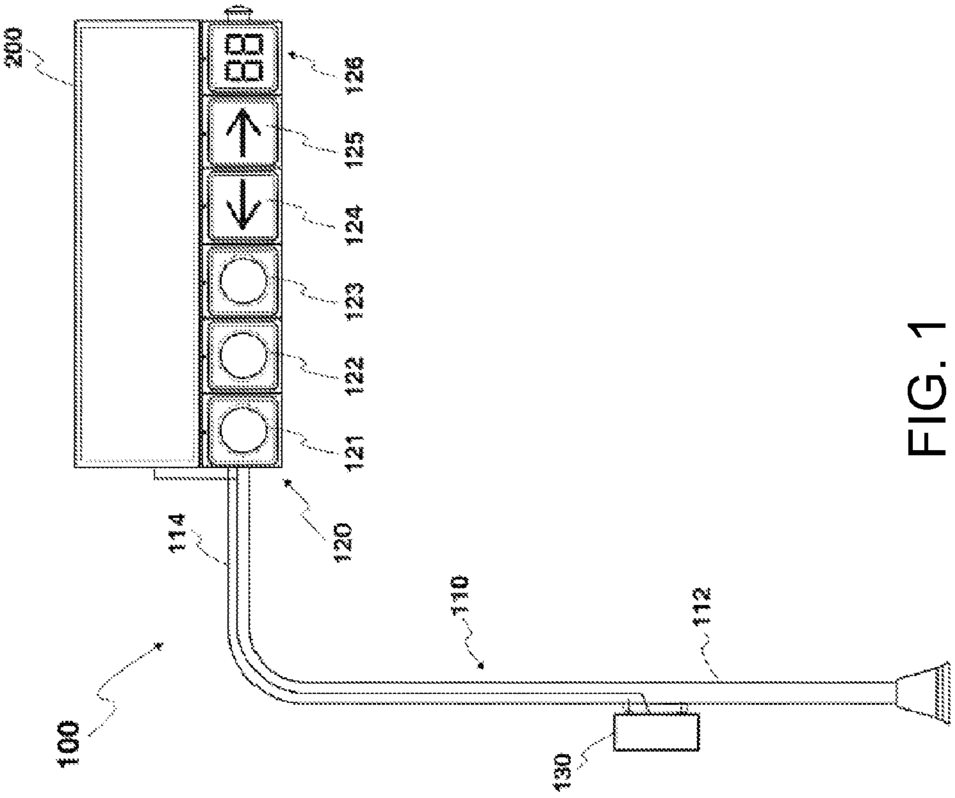
FIG. 1 is a diagram of a digital electronic display in a state connected to a traffic signal used at an intersection according to an embodiment of the present disclosure.

Embodiments of the present disclosure provide a traffic signal connected digital electronic display and a method of controlling the same. In the following detailed description, references are made to the accompanying drawings that form a part hereof, and in which are shown by way of illustration specific embodiments or examples. Referring now to the drawings, in which like numerals represent like elements through the several figures, aspects of the present invention will be described.

Referring to FIG. 1, a diagram illustrates a digital electronic display in a state connected to a traffic signal used at a traffic intersection. The traffic signal 100 includes a supporting structure 110, a signal stack 120 comprising various lights, and a traffic signal controller 130. The supporting structure 110 includes a vertical pole 112, and a horizontal pole 114. The vertical pole 112 and the horizontal pole 114 can be two portions of one continuous, but bent pole, or vertical pole 112 and horizontal pole 114 can be two poles connected together.

In the disclosed embodiment, the signal stack 120 includes a red light 121, a yellow light 122, a green light 123, a left arrow 124, a right arrow 125, and a timer display 126. The timer display 126 may be used as a countdown timer that shows (for example, in a separate color such as amber) the number of seconds until the green light 123 is illuminated, and may also show (for example, in a separate color such as amber) the number of seconds until the red light 121 is illuminated. The traffic signal controller 130 is mounted on the vertical pole 112 of the supporting structure 110 and is electrically connected to the signal stack 120. The traffic signal controller 130 may also be mounted within the supporting structure 110 or on the horizontal pole 114 of the supporting structure 110.

The digital electronic display 200 is mounted on the traffic signal 100 and is electrically connected to the traffic signal controller 130. In some embodiments, the digital electronic display 200 is mounted on top of the signal stack 120, as shown in FIG. 1. In other embodiments, the digital electronic display 200 is mounted under the signal stack 120, on the vertical pole 112 of the supporting structure 110, or on the horizontal pole 114 of the supporting structure 110. In some embodiments, the digital electronic display 200 is mounted hanging down from the horizontal pole 114 of the supporting structure 110 using brackets (not shown) that allow for slight swinging of the digital electronic display 200 during high wind conditions. This would prevent the digital electronic display 200 from being damaged or even torn off of the supporting structure 110 by destructive winds, such as those encountered during a hurricane.

Figure 2:
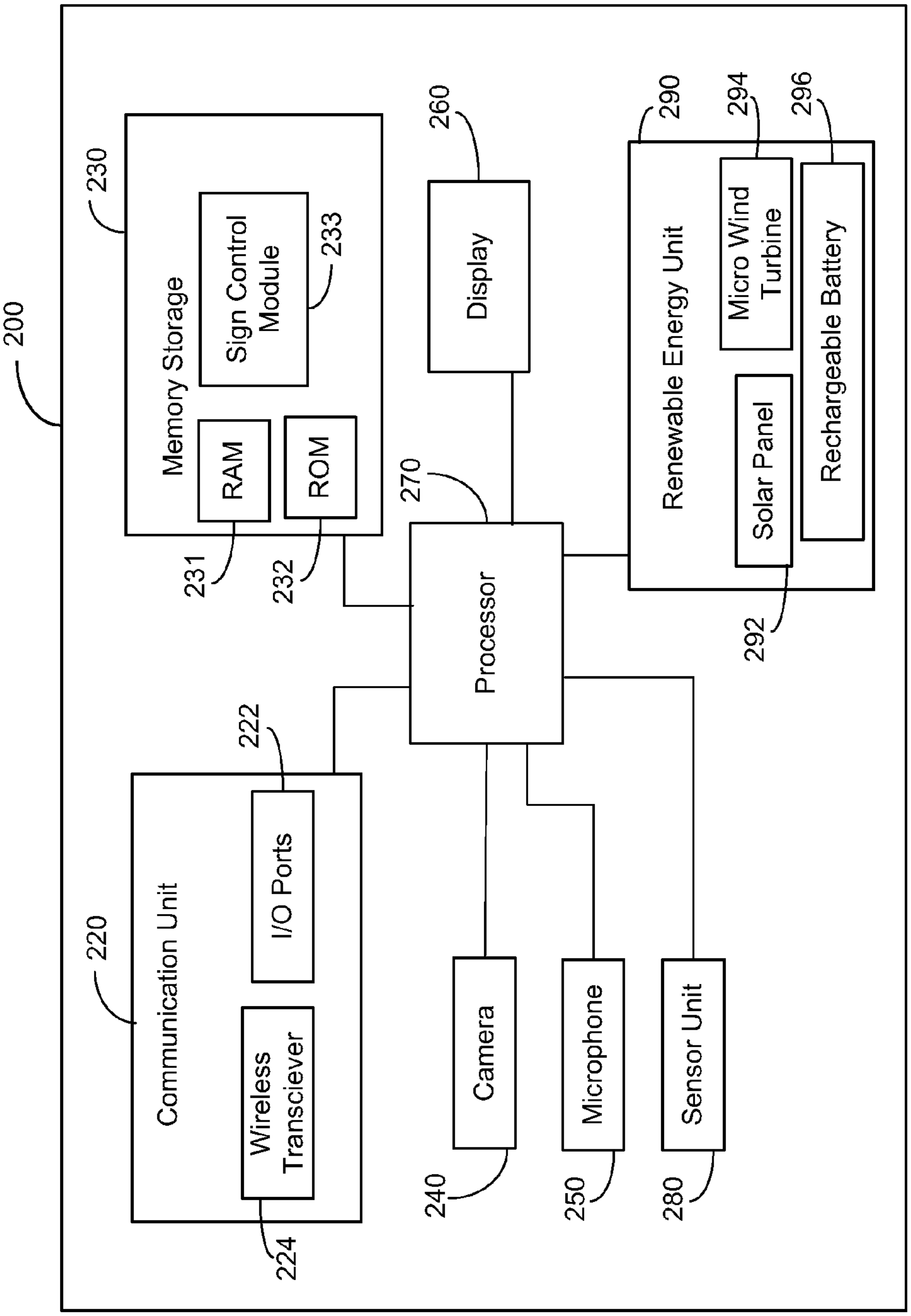
FIG. 2 is a block diagram of a digital electronic display according to an embodiment of the present disclosure.

Referring to FIG. 2, a block diagram will be described that illustrates a digital electronic display according to an embodiment of the present invention. The digital electronic display 200 comprises a communication unit 220, a memory 230, a camera 240, a microphone 250, a display screen 260, and a processor 270.

The communication unit 220 includes an input/output port unit 222 and a wireless transceiver 224. The input/output port unit 222 includes a plurality of ports (not shown) for connection to a power source (not shown), such as an alternating current (AC) power supply, and for connection to the traffic signal controller 130. The traffic signal 100 may be connected to the same power source furnishing power to the digital electronic display 200. In some embodiments, one of the ports of the input/output port unit 222 is connected to the Internet through a line technology, such as cable, ADSL (Asymmetric Digital Subscriber Line), or T-1 lines, using a corresponding port provided by the traffic signal controller 130.

The wireless transceiver 224 allows for wireless connection to another device (not shown) to send and receive content wirelessly via radio frequency communication, microwave communication, or infrared (IR) short-range communication. For example, Wi-Fi®, Bluetooth®, or related standards, or a cellular network may be used for wireless connection to another device via the wireless transceiver 224. In some embodiments, content is sent and received to and from a web portal via the Internet, in which case connection to the Internet is made wirelessly using radio frequency bands or an Internet over Satellite (IoS) connection.

The memory storage 230 stores the content that is received through the input/output port unit 222 or through the wireless transceiver 224. For example, advertising content sent from a web portal via the Internet is received using a line technology at the input/output port unit 222 and stored in the memory 230. Alternatively, advertising content sent from a wireless device via radio frequency communication is received through the wireless transceiver 224 and stored in the memory 230. As another example, advertising content sent from a web portal via the Internet is received wirelessly using a radio frequency band or IoS at the wireless transceiver 224 and stored in the memory 230.

The memory storage 230 comprises in one embodiment RAM memory 231 representing volatile memory. Memory storage 230 also comprise ROM memory 232, representing non-volatile memory. The memory storage may also store programming instructions, a sign control module 233, which when executed cause the processor to perform the disclosed operations and processes.

The storage memory 230 is used to store programs for use by the processor 270 and can comprise in one embodiment mass storage media. One such program stored is the sign control module 233, which stores instructions which when executed cause the processor to perform the methods disclosed herein. The memory 230 may also be used to store processing results of the processor 270. The memory may also be used to store image data. The memory 230 is connected to the processor 270 through a mass storage controller (not shown) connected to the bus (not shown). The memory 230 and its associated computer-readable media provide non-volatile storage for the processor 270. Although the description of computer-readable media contained herein may refer to a mass storage device, such as a hard disk or CD-ROM drive, it should be appreciated by those skilled in the art that computer-readable media can be any available media that can be accessed by the processor 270 including any of the various forms of solid state memory.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the processor 270.

In some embodiments, the content stored in the memory 230 is advertising content. The content may include content segments and metadata. The metadata specifies how and when specific content segments are to be presented. For example, the metadata may specify that certain content segments are to be presented in the evening during rush hour. As another example, there may be a plurality of digital electronic displays 200 associated with a plurality of traffic signals 100, and the metadata may specify which content segments are to be presented on which digital electronic displays 200.

The camera 240 captures images and outputs a corresponding image signal. In some embodiments, the camera 240 captures images of vehicles that the traffic signal 100 controls, that is, of vehicles in front of the traffic signal 100. For example, as will be described below, images of vehicles when the red light 121 of the signal stack 120 is illuminating may be captured by the camera 240, and the corresponding image signal may be used by the digital electronic display 200.

The microphone 250 detects sound in the vicinity of the digital electronic display 200 and outputs a corresponding sound signal. The sound signal may be used by the digital electronic display 200 in a manner that will be described below.

The display screen 260 presents the content stored in the memory 230 through control by the processor 270. The display screen 260 may be based on any display technology capable of presenting digital content, such as but not limited to liquid crystal display (LCD) technology, plasma display panel (PDP) technology, organic light-emitting diode (OLED) technology, vacuum fluorescent (VF) technology, and electronic paper technology.

In some embodiments, the display screen 260 includes a plurality of sections with a slight spacing between the sections to allow for the passage of air. As an example, the display screen 260 may be based on a light-emitting diode (LED) display screen technology with sections spaced apart horizontally and/or vertically. With such a configuration, the digital electronic display 200 can better withstand high wind conditions and not be damaged by the same. In some embodiments, the display screen 260 is mounted separately from the remainder of the elements of the digital electronic display 200. For example, the display screen 260 may be mounted on the signal stack 120, and the remainder of the elements of the digital electronic display 200 may be disposed in a housing (not shown) and the housing may be mounted on or in the horizontal pole 114 of the supporting structure 110.

The processor 270 is connected to the input/output port unit 222 and the wireless transceiver 224 of the communication unit 220, the memory 230, the camera 240, the microphone 250, and the display screen 260.

In some embodiments, the processor 270 learns the timing of the traffic signal 100 through the connection between the digital electronic display 200 and the traffic signal controller 130 of the traffic signal 100 via the port unit 222. For example, the processor 270 may learn how long each of the red light 121, the yellow light 122, the green light 123, the left arrow 124, and the right arrow 125 is illuminated. Since the behavior of the traffic signal 100 may vary depending on the time of day, the day of the week, and other factors, the processor 270 performs continuous learning of the timing of the traffic signal 100 and adjusts the learned timing. In some embodiments, the learned timing is stored in the memory 230 in the form of a traffic signal timing schedule. The traffic signal timing schedule learned by the processor 270 may include a separate timing schedule of the traffic signal 100 for each day of the week.

In embodiments where the processor 270 learns the timing of the traffic signal 100, the processor 270 displays the content stored in the memory 230 on the display screen 260 based on the metadata associated with the content and further based on reference to the learned timing of the traffic signal 100. For example, in embodiments where the content received through the input/output port unit 222 or the wireless transceiver 224 includes content segments and metadata, the processor 270 displays certain content segments on the display screen 260 during times when the red light 121 of the traffic signal 100 is illuminated and at specific times during the day, as specified by the metadata. To provide a more specific example, the metadata may indicate that certain content segments are to be presented late at night on Saturdays and when the red light 121 of the traffic signal 100 is illuminated, and so the processor 270 displays these content segments in a manner as specified by the metadata and based on the learned timing of the traffic signal 100.

In some embodiments, the processor 270 performs control such that the digital electronic display 200 enters into a low-power state when the green light 123 of the traffic signal 100 is illuminated. For example, in the low-power state, the display screen 260 may be turned off. As another example, in the low-power state, power to all or multiple elements of the digital electronic display 200 may be removed. In some embodiments, the processor 270 performs control to place the digital electronic display 200 in a low-power state when the red light 121 or the yellow light 122 is flashing. The traffic signal controller 130 may operate to detect a fault in the traffic signal 100 and thereby control either the red light 121 or the yellow light 122 to flash. The processor 270 of the digital electronic display 200 detects such a state of the traffic signal 100 through connection to the traffic signal controller 130 and places the digital electronic display 200 in a low-power state so that the content stored in the memory 230 is not displayed at such times.

In some embodiments, the processor 270 controls displaying the content on the display screen 260 with reference to the learned timing of the left and right arrows 124, 125 of the traffic signal 100 and based on the metadata in the content. For example, the processor 270 displays a particular content segment on the display screen 260 when the left arrow 124 is illuminated and a particular content segment on the display screen 260 when the right arrow 125 is illuminated, as specified by the metadata. As an example, the particular content segment displayed when the left arrow 124 is illuminated may relate to a restaurant located a certain distance away in the leftward direction from the intersection where the traffic signal 100 is placed. The particular content segment in this case may include the name of a restaurant, the distance to the restaurant (for example, 100 meters), the restaurant slogan, a picture of the restaurant, etc.

In some embodiments, after learning the timing of the traffic signal 100, the processor 270 performs control to display a countdown timer on the display screen 260. The countdown timer generated by the processor 270 may show the number of seconds until the green light 123 is illuminated, the number of seconds until the red light 121 is illuminated, or both. This may be accomplished by dedicating a portion of the display screen 260 for this purpose. That is, rather than including a seven-segment display to be used as a countdown timer, a specific portion of the display screen 260, for example, a farthest most left or right section thereof, may be dedicated for use in displaying a countdown timer. Hence, with the provision of such a feature, governments may minimize costs associated with providing traffic signals with a countdown timer or costs associated with retrofitting existing traffic signals with a countdown timer, and instead can obtain this feature free of charge from a revenue-producing source.

In some embodiments, the processor 270 analyzes the image signal output by the camera 240 to obtain demographic information. For example, the processor 270 may determine from the image signal output by the camera 240 the number of vehicles making a left turn or a right turn at the traffic signal 100 during a specific time period of a particular day, such as during the entire 24-hour period or during 5-7 p.m. of the particular day. As another example, the processor 270 may determine from the image signal output by the camera 240 the number of vehicles stopped each time the red light 121 is illuminated during a given time period of a particular day. As yet another example, utilizing image-recognition techniques, the processor 270 may determine from the image signal output by the camera 240 the types of vehicles stopped each time the red light 121 is illuminated (e.g., trucks, sport-utility vehicles, sedans, etc.), and even vehicle makes and models of the stopped vehicles. In cities with a high population density (and therefore long lines of vehicles each time the red light 121 is illuminated), the processor 270 may determine from the image signal output by the camera 240 the make and model of each of the vehicles on the front row of vehicles waiting at the red light 121 and thereby obtain a rough approximation of the types of vehicles in a city. The processor 270 may then output the demographic information to another device through the wireless transceiver 224 or through the port unit 222, or to a web portal via the Internet through the wireless transceiver 224 or through the port unit 222.

After receiving the demographic information from the processor 270, advertisers, government agencies, etc. creating the content to be sent to the digital electronic display 200 would be able to determine what kind of content may be best suited for the digital electronic display 200 and make adjustments as necessary. Moreover, advertisers would be able to tailor the advertising content in a way best suited for each digital electronic display 200 (assuming a plurality of digital electronic displays 200). Government agencies may use the demographic information in a way unrelated to the content, such as to determine the areas of a city where traffic bottlenecks are occurring.

In some embodiments, the processor 270 may determine from the image signal output by the camera 240 whether the number of vehicles stopped at the traffic signal 100 when the red light 121 is illuminated exceeds a predetermined number, such as two, and if the predetermined number is not exceeded, the processor 270 may control the digital electronic display 200 to enter into a low-power state. Therefore, power savings can be realized by presenting the content on the display screen 260 only when a sufficient number of commuters are present to view the displayed content.

In some embodiments, the processor 270 analyzes the sound signal output by the microphone 250 to obtain demographic information. As an example, the processor 270 may calculate the decibel level from the sound signal output by the microphone 250 to determine the level of city activity. Such information may be used as a comparison with similar calculations made at digital electronic displays 200 associated with other traffic signals 100 throughout a city. The processor 270 may then output this demographic information to another device through the input/output port unit 222 or the wireless transceiver 224, or to a web portal via the Internet through the input/output port unit 222 or through the wireless transceiver 224. In some embodiments, the processor 270 calculates only the decibel level from the sound signal output by the microphone 250 and outputs the decibel level through the input/output port unit 222 or the wireless transceiver 224. Additional calculations may be made using the decibel level at another device or web portal.

In some embodiments, rather than learning the timing of the traffic signal 100, the processor 270 determines in real time the state of the traffic signal 100 by analyzing the image signal output by the camera 240 to ascertain the state of the vehicles that the traffic signal 100 controls. In other words, the processor 270 determines the state of the vehicles in front of the traffic signal 100, and infers from this determination the state of the traffic signal 100. For example, the processor 270 may determine that the red light 121 of the traffic signal 100 is illuminated upon establishing that the vehicles that the traffic signal 100 controls are stationary. As another example, the processor 270 may determine that the left arrow 124 is illuminated upon establishing that only the leftmost vehicles (rightmost in the captured images) that the traffic signal 100 controls are moving.

Some traffic signal systems are dynamic. That is, the traffic signal controller 130 may dynamically adjust the timing of the traffic signal 100 using, for example, in-pavement detectors or video image processing techniques. In some embodiments of dynamic systems, it is advantageous to utilize the above-described technique of the processor 270 determining the state of the traffic signal 100 in real time by analyzing the image signal output by the camera 240.

Moreover, through such an operation in which the processor 270 determines the state of the traffic signal 100 from the state of the vehicles that the traffic signal 100 controls, the digital electronic display 200 does not need to be connected to the traffic signal controller 130 as described above. This greatly simplifies installation and set-up of the digital electronic display 200.

In some embodiments, the processor 270 may "learn" in conjunction with the above-described operation by determining the state of the traffic signal 100 in real time by analyzing the image signal output by the camera 240. For example, through learning realized either via connection to the traffic signal controller 130 or through analysis of the image signal output by the camera 240, the processor 270 may determine that under no circumstances (at all times every day) is the red light 121 of the traffic signal 100 illuminated for more than 45 seconds. In this case, the processor 270 may stop the presentation of the content on the display screen 260 at (or slightly before) 45 seconds, regardless of whether or not movement of the vehicles indicating illumination of the green light 123 has been detected. Thus, the presentation of the content may be presented substantially for the duration of the red light, which in some embodiments can be at least 95% of the duration time of the red light.

In some embodiments, rather than analyzing the image signal output by the camera 240 to ascertain the state of the vehicles that the traffic signal 100 controls, radar, motion sensors (e.g., passive infrared sensor-based motion detectors), and other such techniques may be used to ascertain the state of the vehicles that the traffic signal 100 controls.

In some embodiments, the processor 270 learns of the traffic signal timing in a manner as described above by analyzing the image signal output by the camera 240, rather than through connection to the traffic signal controller 130. Ease of installation is realized through such operation.

In some embodiments, the digital electronic display 200 further comprises a sensor unit 280 that includes one or more sensors. The sensors may be color sensors, image sensors, etc., and may be positioned so as to allow for illumination detection of the signal stack 120, namely, detection of the illumination states of the red light 121, the yellow light 122, the green light 123, the left arrow 124, and the right arrow 125 of the signal stack 120. In some embodiments, one sensor is positioned in close proximity to each of the red light 121, the yellow light 122, the green light 123, the left arrow 124, and the right arrow 125 of the signal stack 120. In some embodiments, a single sensor is used for illumination detection of the signal stack 120.

The processor 270 is connected to the sensor unit 280 and determines from a detection output thereof the illumination state of the signal stack 120 of the traffic signal 100. The processor 270 may learn the timing of the traffic signal 100 by analyzing the detection output of the sensor unit 280, or may control in real time the presentation of the content on the display screen 260 depending on the state of the signal stack 120 of the traffic signal 100, or may use learning in conjunction with real-time control as described above.

It is noted that by determining the illumination state of the signal stack 120 of the traffic signal 100 from the detection output of the sensor unit 280, the digital electronic display 200 does not need to be connected to the traffic signal controller 130. Hence, with this configuration, installation is greatly simplified.

In some embodiments, the digital electronic display 200 further comprises a renewable energy unit 290. The renewable energy unit 290 may include a solar panel 292, a micro wind turbine 294, and a rechargeable battery 296 that is charged by the solar panel 292 and/or the micro wind turbine 294. The rechargeable battery 296 of the renewable energy unit 290 provides power to all elements of the digital electronic display 200. Hence, the digital electronic display 200 does not need to be connected to an external power source, such as an AC power supply to which the traffic signal 100 is also connected, as described above. Ease of installation is achieved with the provision of the renewable energy unit 290. In this and the other configurations that allow for simplified installation, the goal of realizing a fully autonomous unit is also realized.

In some embodiments, the processor 270 checks the charge state of the rechargeable battery 296 of the renewable energy unit 290 and performs control to present content on the display screen 260 only when the charge level of the rechargeable battery 296 is at or above a threshold level. In some embodiments, the processor 270 checks the charge state of the rechargeable battery of the renewable energy unit 290 and performs control so that power is obtained from an external power source if the charge level of the rechargeable battery 296 is below a threshold level.

Figure 3:
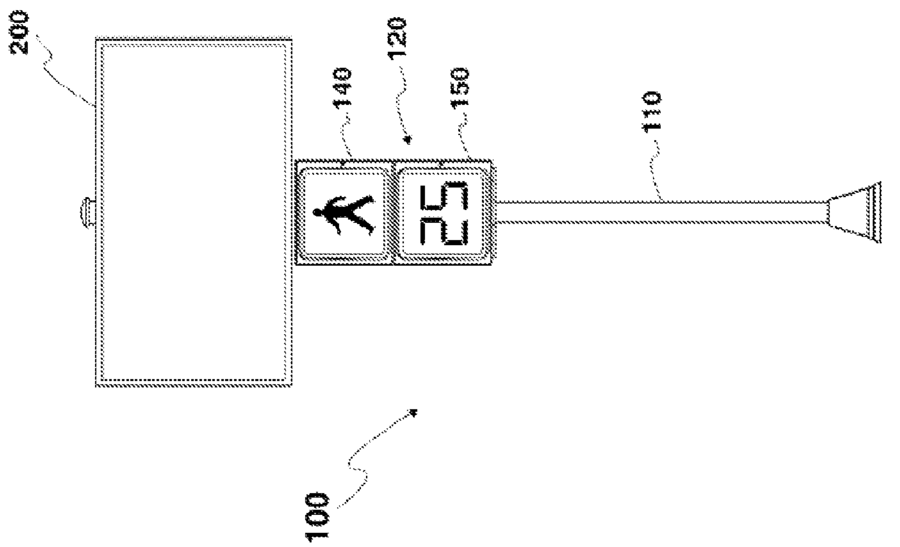
FIG. 3 is a diagram of a digital electronic display in a state connected to a traffic signal used at a pedestrian crossing according to an embodiment of the present disclosure.

In some embodiments, as shown in FIG. 3, the traffic signal 100 is a signaling device used at a pedestrian crossing. In such embodiments, the traffic signal 100 is simpler in construction. For example, the signaling stack 120 of the traffic signal 100 may include an upper light 140 that functions both as a red light and a countdown timer for the green light, and a lower light 150 that functions both as a green light and a countdown timer for the red light. The digital electronic display 200 may be mounted on top of the signaling stack 120 of the traffic signal 100, as shown in FIG. 3, on the supporting structure 110 of the traffic signal 100, or to the side of the signaling stack 120 of the traffic signal 100.

The processor 270 may function similarly as described above when the traffic signal 100 is a signaling device used at an intersection. However, in this embodiment, using image processing techniques, the processor 270 may analyze the image signal output by the camera 240 to determine demographics of pedestrians when the upper light 140 is illuminated as a red light. Moreover, the processor 270 may display the content stored in the memory 230 on the display screen 260 based on the determined demographics of the pedestrians waiting at the red light 140 of the traffic signal 100, based on the learned timing of the traffic signal 100 (or until illumination of the green light 150 is detected on the basis of pedestrian actions or on the basis of detected illumination of the green light 150), and based on to the metadata in the content.

Therefore, for example, when it is determined that the pedestrians waiting at the red light 140 are children, the processor 270 may operate such that appropriate content segment is displayed on the display screen 260. As another example, when it is determined that the pedestrians waiting at the red light 140 are of no particular demographic group (a mixture of children, adults, male, and female), the processor 270 may perform control such that an advertising content segment related to a product with a broad appeal across all demographic groups is displayed on the display screen 260. As yet another example, when many pedestrians are waiting at the red light 140, the processor 270 may perform control so that demographics of the pedestrians at the front of the group may be determined, after which a content segment appropriate to these pedestrians may be displayed on the display screen 260.

Figure 4:
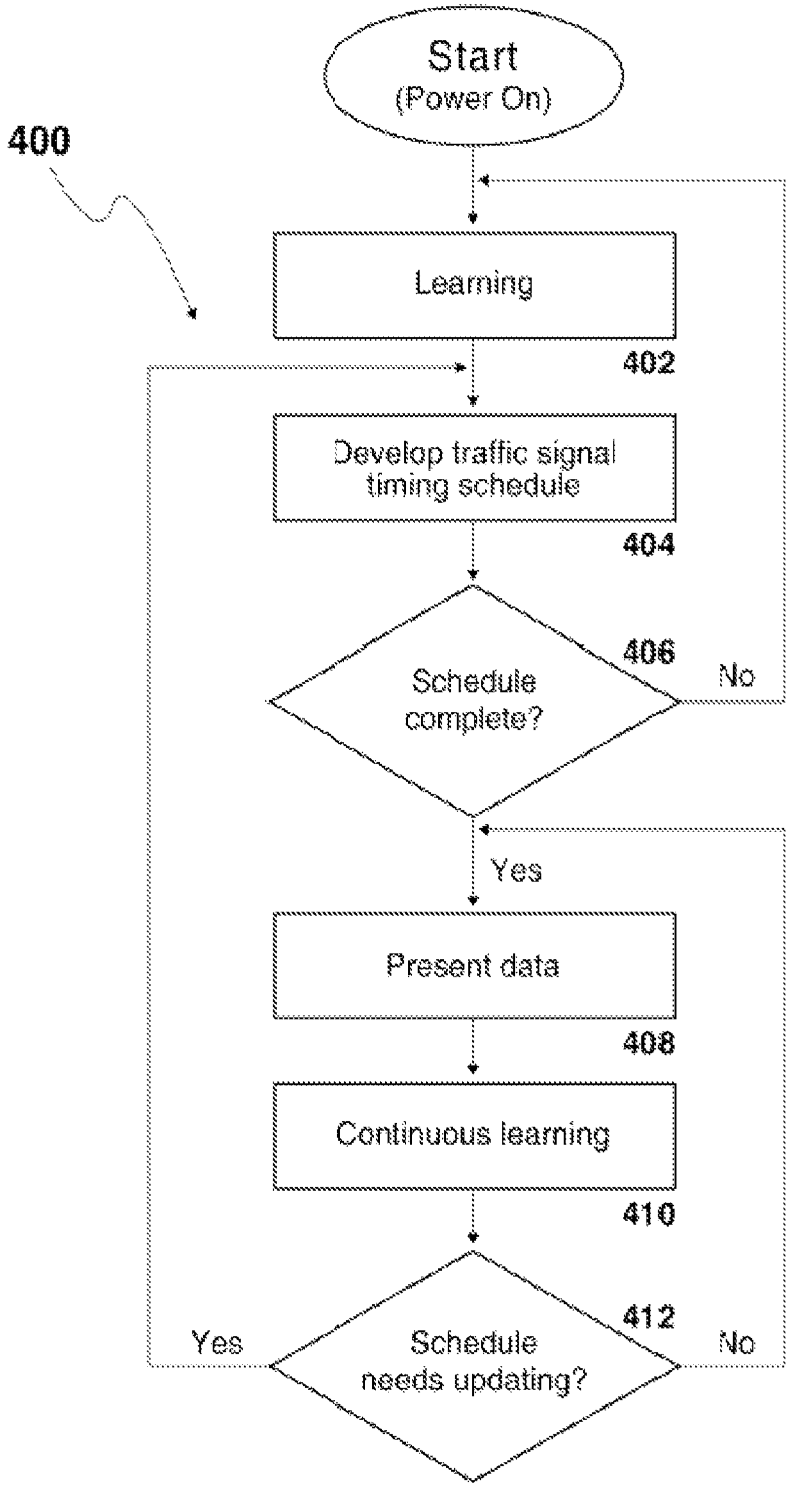
FIG. 4 is a flow diagram illustrating a method for controlling a digital electronic display that is connected to a traffic signal used at an intersection according to an embodiment of the present disclosure.

Referring to FIG. 4, a flow diagram will be described that illustrates a method for controlling a digital electronic display that is connected to a traffic signal used at an intersection according to an embodiment of the present invention. The routine 400 begins at operation 402, where the processor 270 learns the timing of the traffic signal 100. Learning may occur by the processor 270 determining the illumination states of the signal stack 120 made possible through connection between the digital electronic display 200 and the traffic signal controller 130 of the traffic signal 100 via the port unit 222. Alternatively, learning may occur by the processor 270 determining the illumination states of the signal stack 120 by analyzing the detection output of the sensor unit 280. Learning may also occur by the processor 270 analyzing the image signal output by the camera 240, determining the operational states of the vehicles that the traffic signal 100 controls from the image signal, and inferring from the operational states of the vehicles the illumination states of the signal stack 120.

From operation 402, the routine 400 continues to operation 404, where the processor 270 develops a traffic signal timing schedule. In some embodiments, the traffic signal timing schedule is stored in the memory 230. As an example, the traffic signal timing schedule may include lengths of illumination for each of the red light 121, the yellow light 122, the green light 123, the left arrow 124, and the right arrow 125 of the signal stack 120, and any variations of the same, such as for different times of the day and for different days of the week.

The routine 400 then continues to operation 406, where a determination is made as to whether the traffic signal timing schedule is complete. For example, the processor 270 may determine after an hour of learning that timing of each of the red light 121, the yellow light 122, the green light 123, the left arrow 124, and the right arrow 125 of the signal stack 120 is repeating and therefore that the traffic signal timing schedule is complete. In some instances, variations in the timing of the red light 121, the yellow light 122, the green light 123, the left arrow 124, and the right arrow 125 of the signal stack 120 are detected, and so additional observation and learning by the processor 270 is needed (i.e., the processor 270 determines that the traffic signal timing schedule is not complete).

Continuous variations with no discernible pattern in the timing of the red light 121, the yellow light 122, the green light 123, the left arrow 124, and the right arrow 125 of the signal stack 120 may be detected. If this occurs, the processor 270 may determine that the traffic signal 100 is operating under a dynamic scheme, and in some embodiments, the processor 270 may switch to dynamic operation, in which the state of the traffic signal 100 is determined by analyzing the image signal output by the camera 240 and displaying the content on the display screen 260 in response to the results of such analysis, or in which the state of the traffic signal 100 is determined from the output of the sensor unit 280 and displaying the content on the display screen 260 in response to the state of the signal stack 120 so determined.

If, at operation 406, the traffic signal timing schedule is not complete, the routine 400 branches back to operation 402. If the traffic signal timing schedule is complete, the routine 400 continues to operation 408.

At operation 408, the processor 270 performs control to present the content with reference to the traffic signal timing schedule and based on the metadata in the content. It is noted that presenting content may include periods when the content is actually being presented on the display screen 260, such as at periods corresponding to when the red light 121 or the left and right arrows 124, 125 are illuminated, and may include periods when no content is being presented on the display screen 260, such as at periods corresponding to when the green light 123 is being illuminated.

From operation 408, the routine 400 continues to operation 410, where the processor 270 continues to learn the timing of the traffic signal 100. From operation 410, the routine 400 continues to operation 412, where a determination is made as to whether the traffic signal timing schedule needs to be updated. After continuous learning, the processor 270 may determine that the timing of any one of the red light 121, the yellow light 122, the green light 123, the left arrow 124, and the right arrow 125 of the signal stack 120 is different from that in the previously learned traffic signal timing schedule. In this case, the processor 270 determines that the traffic signal timing schedule needs to be updated. If the traffic signal timing schedule does not need to be updated, the routine 400 branches back to operation 408. If the traffic signal timing schedule does need to be updated, the routine 400 branches back to operation 404.

Figure 5:
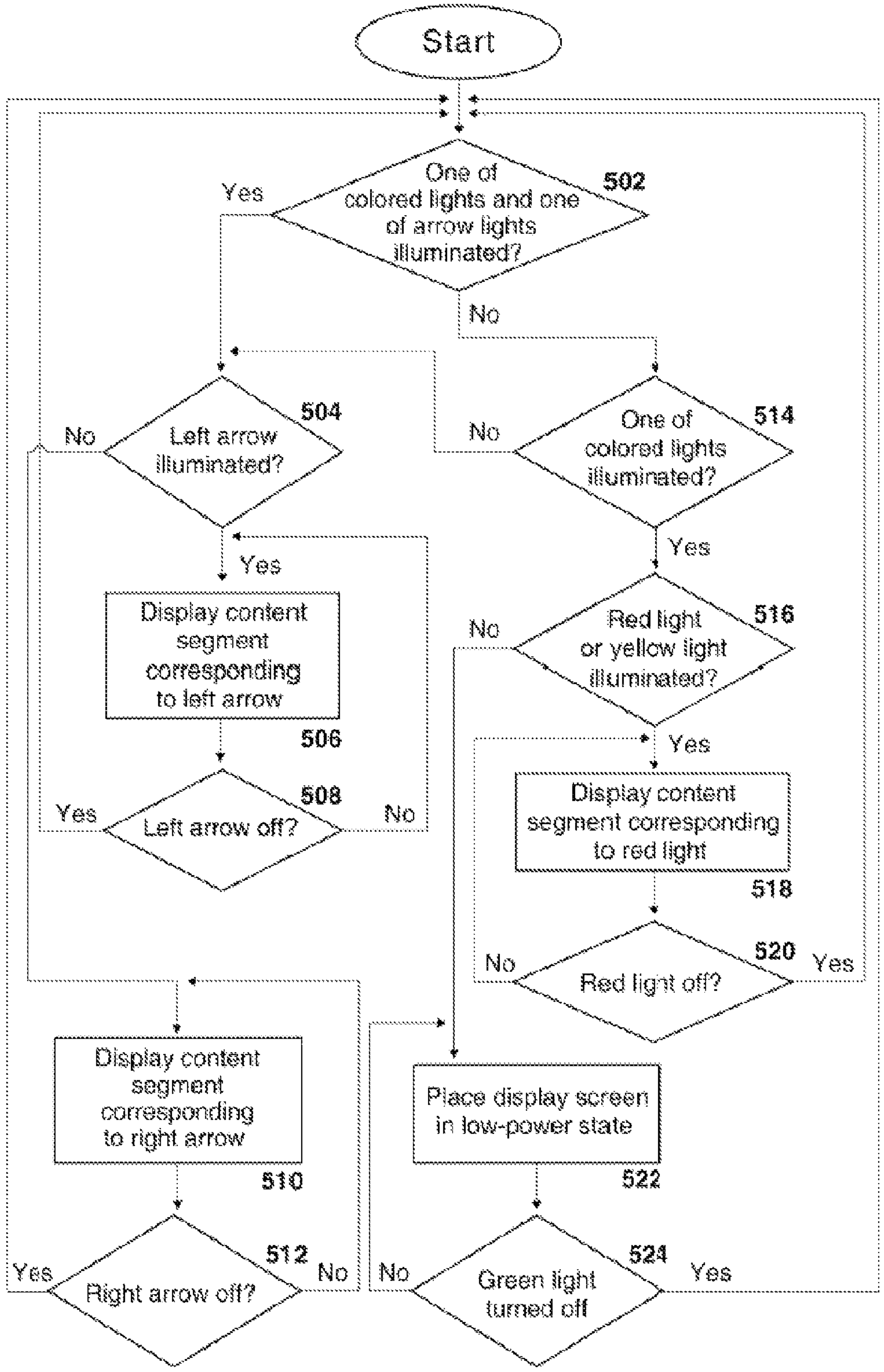
FIG. 5 is a flow diagram illustrating a method of presenting content on a display screen of a digital electronic display according to operational states of a traffic signal as determined in real-time using an output of a sensor unit or a camera according to an embodiment of the present disclosure.

Referring to FIG. 5, a flow diagram will be described that illustrates a method of presenting content on a display screen of a digital electronic display according to operational states of a traffic signal as determined in real-time using an output of a sensor unit or a camera. It will be assumed for the exemplary embodiment described with reference to FIG. 5 that the content to be presented includes content segments and metadata.

It is noted that in embodiments where the processor 270 learns the timing of the traffic signal 100, the processor 270 performs control to present the content on the display screen 260 with reference to the traffic signal timing schedule (and based on the metadata in the content). Therefore, presenting of the content simply follows the learned timing. However, this is not the case with embodiments where the traffic signal timing schedule is not determined beforehand, and instead, the state of the traffic signal 100 is determined in real-time from the detection output of the sensor unit 280 or through analysis of the image signal output by the camera 240, and so it is with respect to such embodiments that the process of FIG. 5 is directed.

The routine 500 begins at operation 502, where a determination is made as to whether one of the colored lights 121, 122, 123 and one of the arrow lights 124, 125 is illuminated. If one of the colored lights 121, 122, 123 and one of the arrow lights 124, 125 is illuminated, the routine 500 branches to operation 504.

At operation 504, a determination is made as to whether the left arrow 124 is illuminated. In this embodiment, if one of the colored lights 121, 122, 123 and one of the arrow lights 124, 125 is illuminated, precedence is given to the arrow lights 124, 125. That is, the display of content corresponding to the arrow lights 124, 125 is given precedence over the display of content corresponding to the colored lights 121, 122, 123. Accordingly, if the left arrow 124 is illuminated, the routine 500 continues to operation 506, where the processor 270 displays a content segment corresponding to the left arrow 124 based on the metadata.

From operation 506, the routine 500 continues to operation 508, where a determination is made as to whether the left arrow 124 is turned off. If the left arrow 124 is turned off, the routine 500 branches back to operation 502, that is, to the beginning of the routine 500. If the left arrow 124 is not turned off, the routine 500 branches back to operation 506 for continued display of the content segment corresponding to the left arrow 124.

If, at operation 504, the left arrow 124 is not illuminated, then the right arrow 125 must be illuminated. Accordingly, if the left arrow 124 is not illuminated, the routine 500 branches to operation 510, where the processor 270 displays a content segment corresponding to the right arrow 125 based on the metadata.

From operation 510, the routine 500 continues to operation 512, where a determination is made as to whether the right arrow 125 is turned off. If the right arrow 125 is turned off, the routine 500 branches back to operation 502, that is, to the beginning of the routine 500. If the right arrow 125 is not turned off, the routine 500 branches back to operation 510 for continued display of the content segment corresponding to the right arrow 125.

If, at operation 502, one of the colored lights 121, 122, 123 and one of the arrow lights 124, 125 is not illuminated, the routine 500 continues to operation 514, where a determination is made as to whether one of the colored lights 121, 122, 123 is illuminated. If one of the colored lights 121, 122, 123 is not illuminated, this indicates that one of the arrows 124, 125 is illuminated, and accordingly, the routine 500 branches to operation 504. The routine 500 then goes through operations 504-512, as described above. If, at operation 514, one of the colored lights 121, 122, 123 is illuminated, the routine 500 continues to operation 516.

At operation 516, a determination is made as to whether the red light 121 or the yellow light 122 is illuminated. If the red light 121 or the yellow light 122 is illuminated, the routine

500 continues to operation 518, where the processor 270 displays a content segment corresponding to the red light 121 based on the metadata.

From operation 518, the routine 500 continues to operation 520, where a determination is made as to whether the red light 121 is turned off. In some embodiments, there may be a delay before the determination of whether the red light 121 is turned off is made to provide time for the yellow light 122 to switch to the red light 121, in case the yellow light 122 was illuminated during the determination made at operation 516. If the red light 121 is turned off, the routine 500 branches back to operation 502, that is, to the beginning of the routine 500. If the red light 121 is not turned off, the routine 500 branches back to operation 518 for continued display of the content segment corresponding to the red light 121.

If, at operation 516, the red light 121 or the yellow light 122 is not illuminated, then the green light 123 must be illuminated. Accordingly, if the red light 121 or the yellow light 122 is not illuminated, the routine 500 continues to operation 522, where the processor 270 places at least the display screen 260 in a low-power state.

From operation 522, the routine 500 continues to operation 524, where a determination is made as to whether the green light 123 is turned off. If the green light 123 is turned off, the routine 500 branches back to operation 502, that is, to the beginning of the routine 500. If the green light 123 is not turned off, the routine 500 branches back to operation 522, where the processor 270 continues with control of the display screen 260 in a low-power state. Thus, the display screen may be in a low power state for substantially all of the duration of the green light, e.g., at least 95% or more of the time the duration of the green light is on.

Figure 6A:
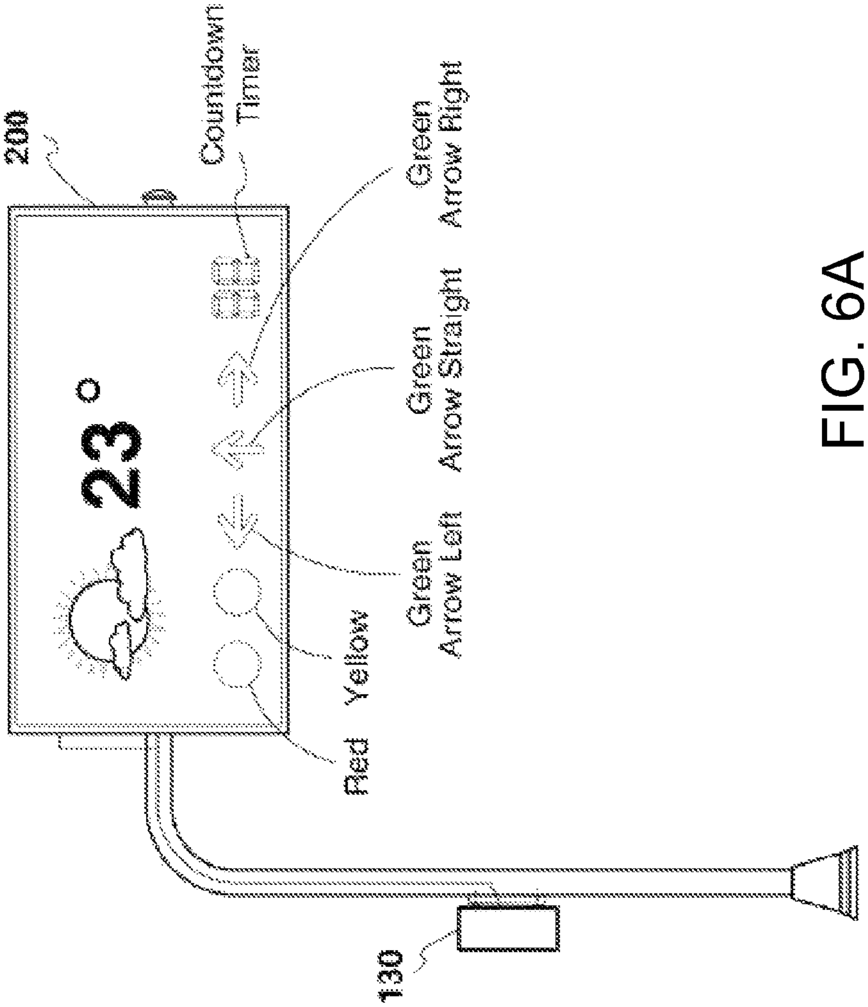
FIG. 6 is a schematic diagram illustrating various exemplary display states of a traffic signal according to an embodiment of the present disclosure.
Figure 6B:
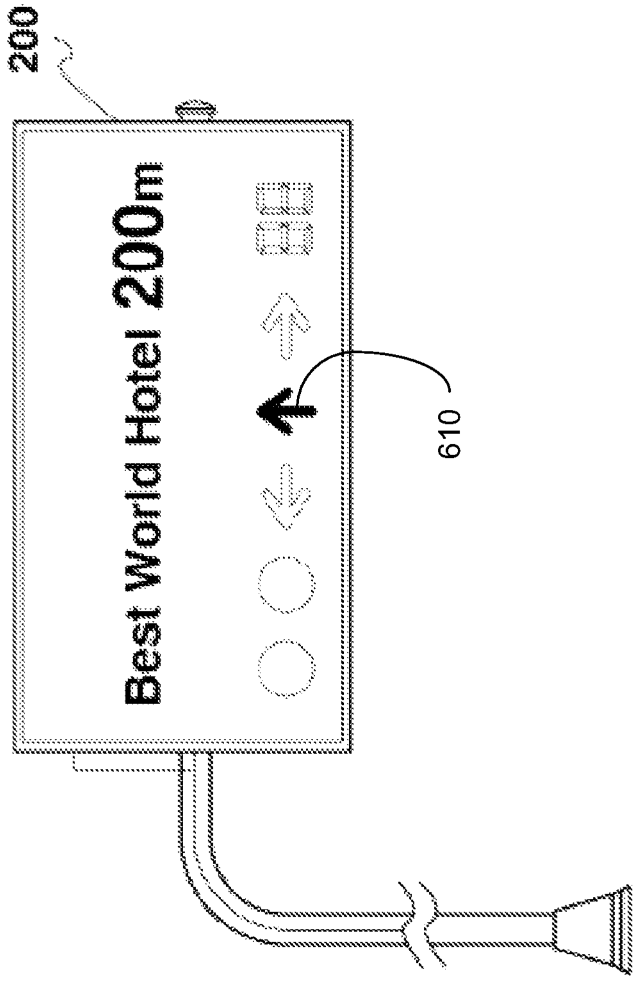
Figure 6C:
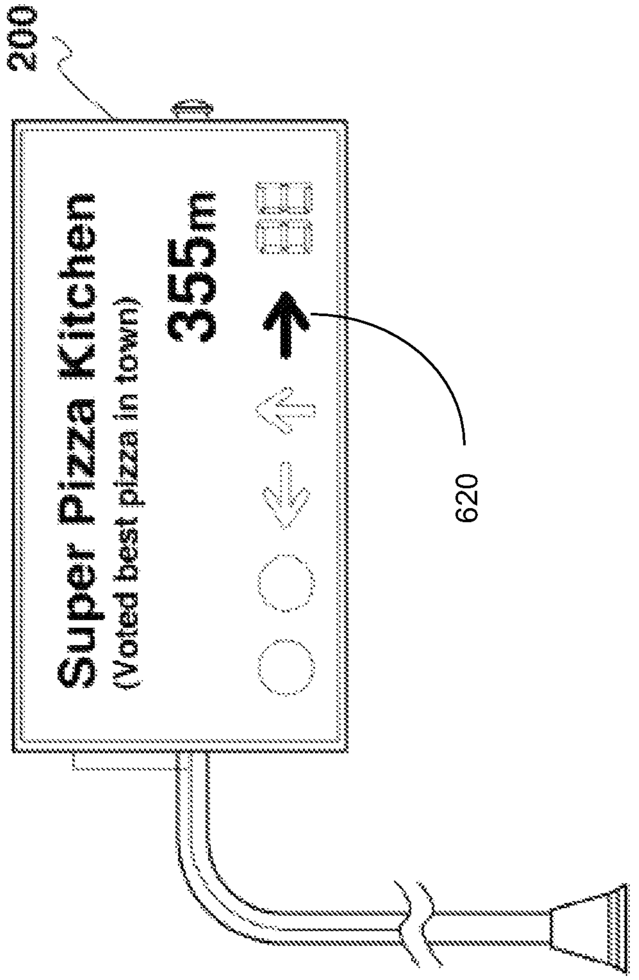

Referring to FIG. 6, in some embodiments, the digital electronic display 200 replaces the signal stack 120 of the traffic signal 100. That is, a red light, a yellow light, a green light, a left arrow, a right arrow, a straight arrow, and a timer display may be shown as images on the display screen 260, such as by dedicating portions (or even a single portion) of the display screen 260 for such display. Embodiments of how images may appear on the display screen are shown in FIGS. 6A, 6B, and 6C. In FIG. 6A, the sign 200 displays weather information. In FIG. 6B, the sign 200 displays directions to a nearby hotel using an arrow 610. In FIG. 6C, a situation is shown where the right arrow 620 is illuminated, and at the same time, an advertisement appears on the display screen 200 related to the "Super Pizza Kitchen" restaurant which is 355 m in the rightward direction. The digital electronic display 200 may be connected to the traffic signal controller 130, and receive control signals therefrom for illumination control of these portions of the display screen 260. Alternatively, the processor 270 may determine in real time the state of the traffic signal 100 by analyzing the image signal output by the camera 240 as described above and correspondingly control the illumination of these portions of the display screen 260.

By displaying the red, yellow, and green lights, the left and right arrows, and the timer display as images on the display screen 260, a combined traffic light and digital electronic display may be provided as a single unit, greatly simplifying installation and manufacture. This would be particularly useful for areas that desire to replace their old-fashioned traffic lights with more modern and energy-efficient configurations, and at the same time desire to realize the display of content at the traffic lights.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A traffic signal comprising:

a supporting structure; and a digital electronic display mounted on the supporting structure, the digital electronic display comprising a communication unit configured to receive content including content segments and metadata, a display screen, and a processor configured to:

control the display of at least a red light and a green light on the display screen through illumination of a portion of the display screen with reference to a control signal for controlling the traffic signal, analyze an image signal output by a camera configured to capture images of vehicles in front of the traffic signal to obtain demographic information related to the vehicles in front of the traffic signal, and present one or more of the content segments on the display screen based on the metadata and substantially for the entire duration when the red light is illuminated, wherein the one or more of the content segments presented on the display screen are determined with reference to the demographic information related to the vehicles in front of the traffic signal.

2. The traffic signal of claim 1, wherein the processor is further configured to control the display of an arrow light on the display screen through illumination of another portion of the display screen with reference to the control signal; and wherein the content segments comprise a first content segment corresponding to illumination of the red light and a second content segment corresponding to illumination of the arrow light, wherein the one or more of the content segments presented when the red light is illuminated comprise the first content segment.

3. The traffic signal of claim 2, wherein the processor is further configured to present the second content segment on the display screen based on the metadata and substantially for the entire duration when the arrow light is illuminated.

4. The traffic signal of claim 3, wherein the arrow light comprises one of a left arrow light, a right arrow light or a straight arrow light, and wherein the second content segment comprises information related to a location along a direction indicated by the arrow light.

5. The traffic signal of claim 1, further comprising a traffic signal controller mounted on the supporting structure, connected to the digital electronic display, and configured to output the control signal for controlling the traffic signal.

6. The traffic signal of claim 1, wherein the communication unit comprises a wireless transceiver and a port unit, wherein the content segments are received from another device through the wireless transceiver or the port unit.

7. The traffic signal of claim 1, wherein the processor is further configured to control display of a countdown timer on the display screen through illumination of another portion of the display screen.

8. A method of controlling a traffic signal, the method comprising:

receiving content including a plurality of content segments and metadata, the plurality of content segments comprising a first content segment corresponding to illumination of a red light of the traffic signal and a second content segment corresponding to illumination of a turn light of the traffic signal;

determining when and a duration during which each of the red light and the arrow light of the traffic signal is illuminated; and presenting the first content segment corresponding to the illumination of the red light on a display screen based on the metadata and substantially for the entire duration when the red light is illuminated, wherein the first content segment is determined with reference to demographic information related to vehicles in front of the traffic signal that is obtained by analyzing an image signal output by a camera configured to capture images of the vehicles in front of the traffic signal.

9. The method of claim 8, further comprising:

determining when and a duration during which the turn light of the traffic signal is illuminated; and presenting the second content segment on the display screen based on the metadata and substantially for the entire duration when the turn light is illuminated.

10. The method of claim 9, wherein when and the duration during which each of the red light and the turn light of the traffic signal is illuminated is determined based on a control signal output by a traffic signal controller of the traffic signal.

11. The method of claim 9, wherein when and the duration during which each of the red light and the turn light of the traffic signal is illuminated is determined by monitoring motion of vehicles in front of the traffic signal captured within an image signal.

12. The method of claim 11, further comprising controlling at least a portion of the display screen to operate in a low-power state, or an off state, in response to the image signal indicating that a number of vehicles at the traffic signal are less than a specified threshold number of vehicles or a green light of the traffic signal is illuminated.

13. The method of claim 9, wherein when and the duration during which each of the red light and the turn light of the traffic signal is illuminated is determined from a detection output of a sensor unit configured to detect illumination states of the traffic signal.

14. The method of claim 9, further comprising estimating a timing schedule for the traffic signal.

15. The method of claim 9, wherein the second content segment comprises information related to a location along a direction indicated by the turn light.

16. A computer-readable storage medium having computer-readable instructions stored thereupon that, when executed by a computer, cause the computer to:

receive content including content segments and metadata, the content segments comprising a first content segment corresponding to illumination of a red light of a traffic signal and a second content segment corresponding to illumination of an arrow light of the traffic signal;

determine when and a duration during which each of the red light and the arrow light of the traffic signal is illuminated;

present the first content segment on a display screen based on the metadata and substantially for the entire duration when the red light is illuminated, wherein the first content segment is determined with reference to demographic information related to vehicles in front of the traffic signal that is obtained by analyzing an image signal output by a camera configured to capture images of the vehicles in front of the traffic signal; and present the second content segment on the display screen based on the metadata and substantially for the entire duration when the arrow light is illuminated.

17. The computer-readable storage medium of claim 16, wherein determining when and the duration during which each of the red light and the arrow light of the traffic signal is illuminated is performed by receiving control signals from a traffic signal controller of the traffic signal.

18. The computer-readable storage medium of claim 16, wherein when and the duration during which each of the red light and the arrow light of the traffic signal is illuminated is determined by analyzing the images of vehicles in front of the traffic signal and monitoring motion of the vehicles within the images.

19. The computer-readable storage medium of claim 16, wherein the arrow light comprises one of a left arrow light, a straight arrow light, and a right arrow light, and wherein the second content segment comprises information related to a location along a direction indicated by the arrow light.

* * * * *